United States Patent [19]

Wallace

[11] Patent Number: 5,978,588
[45] Date of Patent: Nov. 2, 1999

[54] METHOD AND APPARATUS FOR PROFILE-BASED CODE PLACEMENT USING A MINIMUM CUT SET OF THE CONTROL FLOW GRAPH

[75] Inventor: David R. Wallace, San Francisco, Calif.

[73] Assignee: Sun Microsystems, Inc., Palo Alto, Calif.

[21] Appl. No.: 08/884,972

[22] Filed: Jun. 30, 1997

[51] Int. Cl.$^6$ ........................................ G06F 9/45
[52] U.S. Cl. ............................ 395/709; 395/708
[58] Field of Search .................. 395/709, 707, 395/708

[56] References Cited

U.S. PATENT DOCUMENTS

| | | | |
|---|---|---|---|
| 5,555,201 | 9/1996 | Dangelo et al. | 364/489 |
| 5,557,761 | 9/1996 | Chan et al. | 395/709 |
| 5,666,296 | 9/1997 | Gafter | 364/578 |
| 5,787,287 | 7/1998 | Bharadwaj | 395/708 |
| 5,850,552 | 12/1998 | Odani et al. | 395/709 |
| 5,894,576 | 4/1999 | Bharadwaj | 395/709 |

OTHER PUBLICATIONS

Preston Briggs, *Register Allocation Via Graph Coloring*, PH.D. Thesis, Rice University, submitted Apr. 1992, obtained from UMI Dissertation Services: Ann Arbor, MI.

Raymond Lo, Sun Chan, Jim Dehnert, Ross Towle, "Aggregate Operation Movement: A Min–Cut Approach to Global Code Motion," Proceedings available from Springer Verlap, Aug. 26–29, 1996, 14 pages.

Pohua P. Chang, Scott A. Mahlke, Wen–Mei W. Hwu, *Software–Practice and Experience*, "Using Profile Information to Assist Classic Code Optimization," vol. 21(12), John Wiley & Sons, Ltd, Dec. 1991 pp. 1301–1321.

Jens Knoop, Oliver Ruthing Bernhard Steffen, "Lazy Code Motion," Proceedings of SIGPLAN '92 Conference on Programming Language Design and Implementation, San Francisco, CA, Jun. 17–19, 1992.

Rajiv Gupta, Generalized Dominators and Post–dominators, ACM, copyright 1992.

Thomas Ball, James R. Larus, "Optimally Profiling and Tracing Programs," paper presented at 19$^{th}$ Annual ACM SIGNPLAN–SIGACT Symposium on Principles of Programming Languages, ACM Press, pp. 59–70, Jan. 19–22, 1992.

Rahmouni, M.; Jerraya, A.; "Formulation and Evaluation of Scheduling Techniques for Control Flow Graphs"; Proceedings of EURO–DAC '95, European Design Automation Conference; pp. 386–391, Sep. 1995.

Kramer, R.; Gupta, R.; Soffa, M.; "The Combining DAG: A Technique for Parallel Data Flow Analysis"; IEEE Transactions on Parallel and Distributed Systems; vol. 5, Issue 8, pp. 805–813, Aug. 1994.

Alfred V. Aho, Ravi Sethi and Jeffrey D. Ullman, "Compilers Principles, Techniques, and Tools", 1986.

*Primary Examiner*—Tariq R. Hafiz
*Assistant Examiner*—Brian Sattizahn
*Attorney, Agent, or Firm*—Graham & James LLP

[57] ABSTRACT

A method and apparatus placing blocks of object code by a compiler. The code placement is done optimally, using a "cut set technique" that uses the "max-flow/min-cut" principle. A preferred embodiment of the present invention divides a source program into blocks and generates a control flow graph (cfg) and a data flow graph (dfg) for the blocks. The compiler then identifies the strongly connected components (sccs) of the dfg and recursively breaks down the cycles in each scc to yield a plurality of directed acyclic graphs (dfg-dag's). The compiler then finds the "minimum cut set" in the cfg corresponding to each dfg-dag and moves the code into blocks in accordance with the minimum cut sets. Lastly, the compiler generates object code for the blocks.

4 Claims, 16 Drawing Sheets

Adaptive Optimization saturated edge
min cut set = {a, b, d}

→ Control flow edge
- - -▶ Data flow edge

METHOD AND APPARATUS FOR PROFILE-BASED CODE PLACEMENT USING A MINIMUM CUT SET OF THE CONTROL FLOW GRAPH

FIELD OF THE INVENTION

This application relates to compiler software and, specifically, to a method and apparatus for reordering blocks in a compiled computer program, resulting in efficient execution of the computer program.

BACKGROUND OF THE INVENTION

Human beings often write computer programs in a "high level language," such as the C programming language. Computer programs (called "source programs") written in a high level language must be converted into instructions understandable by a computer. This process is called "compiling" the program and is performed by a software program called a "compiler." Thus, a compiler compiles a source program (written in a high level language) into an "object" program, which contains instructions executable by the computer.

Source programs can be thought of as being divided into "logical" blocks. Each block contains one or more statements in the source program. Conventional compilers often rearrange the order of blocks to make execution of the resulting object program more efficient.

Some conventional compilers produce object programs that execute inefficiently. An example of a source program that is often compiled to execute inefficiently is a source program containing a "branch" instruction, such as an "if-then-else" statement. Inefficiencies result when the compiler compiles an "if-then-else" statement in such a way that the computer executing the compiled branch instruction frequently has to transfer execution to a different location in the program. In contrast, a more efficient compilation generates an object program where the computer executing the compiled branch instruction usually "falls through" the branch instruction without having to transfer execution to a different part of the program. Unfortunately, rearranging the blocks of a computer program has some constraints, since making one block a fall-through prevents other blocks from being fall throughs.

Conventional compilers used a predetermined placement method for the blocks in the source code. Unfortunately, when the compiler optimizes code for a first execution profile environment, it effectively "unoptimizes" the code for another execution profile environment.

SUMMARY OF THE INVENTION

The present invention overcomes the problems and disadvantages of the prior art by using "adaptive optimization" techniques. These techniques use a profile-based method of placing blocks of object code. The code placement is done optimally, using a "cut set technique" that uses the "max-flow/min-cut" principle.

More specifically, a preferred embodiment of the present invention divides a source program into blocks and generates a control flow graph (cfg) and a data flow graph for the blocks. The compiler then identifies the strongly connected components (sccs) of the dfg and recursively breaks down the cycles in each scc to yield a plurality of directed acyclic graphs (dfg-dag's). The compiler then finds the "minimum cut set" in the cfg corresponding to each dfg-dag and moves the code into blocks in accordance with the minimum cut sets. Lastly, the compiler generates object code for the blocks.

In accordance with the purpose of the invention, as embodied and broadly described herein, the invention relates to a method of compiling a source program into an object program and of optimally placing code blocks of the source program, the steps performed by a data processing system, of: receiving the source program; dividing the source program into source program blocks; determining a control flow graph, a data flow graph, and a plurality of dfg-dag's for the source program; finding a minimum cut set in a control flow graph generated in accordance with the dfg-dag's; and moving computer instructions between the source code blocks in accordance with the minimum cut set.

In further accordance with the purpose of the invention, as embodied and broadly described herein, the invention relates to an apparatus that compiles a source program into an object program and that optimally places code blocks of the source program, comprising: a portion configured to receive the source program; a portion configured to divide the source program into source program blocks; a portion configured to determine a control flow graph, a data flow graph, and a plurality of dfg-dag's for the source program; a portion configured to find a minimum cut set in a control flow graph generated in accordance with the dfg-dag's; and a portion configured to move computer instructions between the source code blocks in accordance with the minimum cut set.

In still further accordance with the purpose of the invention, as embodied herein, the invention relates to a computer data signal embodied in a carrier wave and representing sequences of instructions which, when executed by a processor, cause said processor to compile a source program into an object program, optimally placing code blocks of the source program, by performing the steps of: executing a computer program to receive the source program; executing the computer program to divide the source program into source program blocks; executing the computer program to determine a control flow graph, a data flow graph and a plurality of dfg-dag's for the source program; executing the computer program to find a minimum cut set in a control flow graph generated in accordance with the dfg-dag's; and executing the computer program to move computer instructions between the source code blocks in accordance with the minimum cut set.

Objects and advantages of the invention will be set forth in part in the description which follows and in part will be obvious from the description or may be learned by practice of the invention. The objects and advantages of the invention will be realized and attained by means of the elements, method steps and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DESCRIPTION OF A PREFERRED EMBODIMENT

Reference will now be made in detail to a preferred embodiment of the invention, an example of which is illustrated in the accompanying drawings. Wherever possible, the same reference numbers will be used throughout the drawings to refer to the same or like parts.

I. Background

Figure 1:
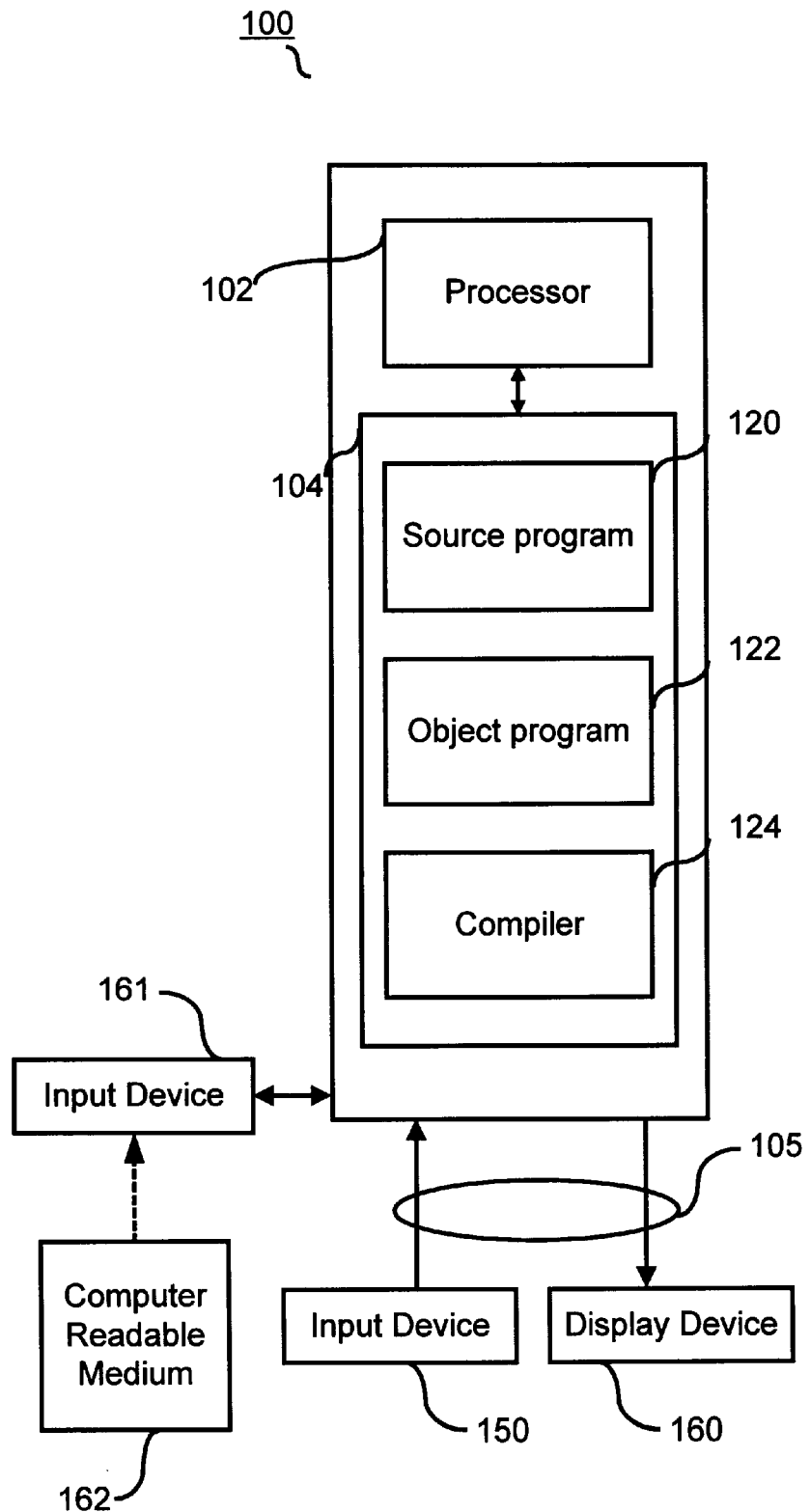
FIG. 1 is a block diagram of a data processing system used in accordance with a preferred embodiment of the present invention.

FIG. 1 is a block diagram of a data processing system used in accordance with a preferred embodiment of the present invention. In FIG. 1, computer system 100 includes a processor 102; a memory 104; input/output lines 105; an input device 150, such as a keyboard, a mouse, and a voice input device; and a display device 160, such as a display terminal. Computer 100 also includes an input device 161, such as a floppy disk drive, CD ROM reader, or DVD reader, that reads computer instructions stored on computer readable medium 162, such as a floppy disk, a CD ROM, or a DVD drive. These computer instructions are the instructions of e.g., compiler 124. Memory 104 also includes a source program 120, written in a high level language, such as, for example, the C programming language, or in assembly language. Memory 104 also includes an object program 122 generated by compiler 124 from source program 120.

A person of ordinary skill in the art will understand that memory 104 also contains additional information, such as application programs, operating systems, data, etc., which are not shown in the figure for the sake of clarity. It also will be understood that computer system 100 can also include numerous elements not shown, such as disk drives, keyboards, display devices, network connections, additional memory, additional CPUs, LANs, input/output lines, etc.

In the following discussion, it will be understood that the steps of methods and flow charts discussed preferably are performed by processor 102 (or similar processors) executing instructions stored in memory 104, such as instructions of compiler 124. It will also be understood that, the invention is not limited to any particular implementation or programming technique and that the invention may be implemented using any appropriate techniques for implementing the functionality described herein. The described embodiment of compiler 124 is written in the C programming language, but the invention is not limited to any particular programming language or operating system.

Figure 2:
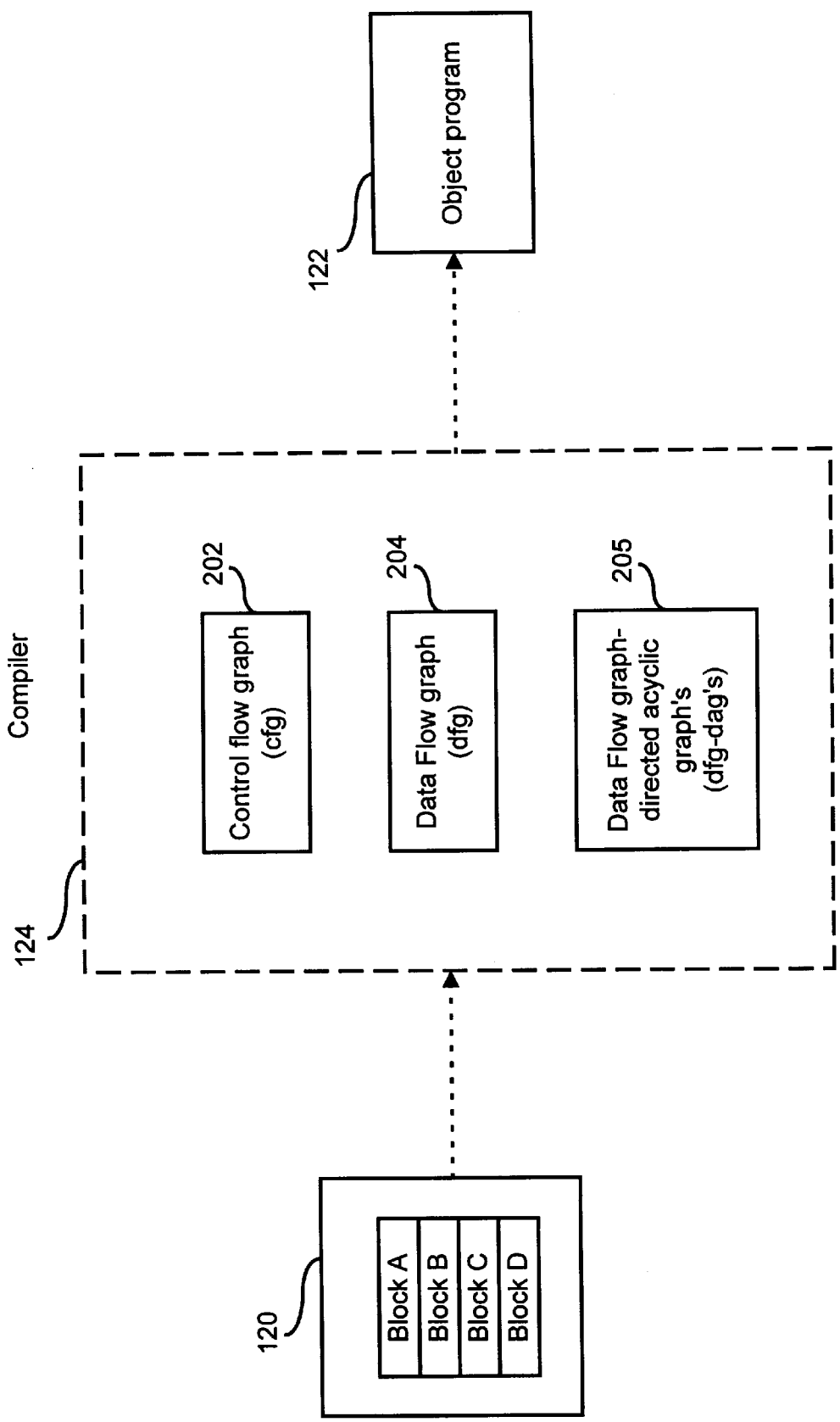
FIG. 2 is a block diagram showing a method of converting a source program to an object program in accordance with a preferred embodiment of the present invention.

FIG. 2 is a block diagram showing a process, performed by compiler 124, of converting a source program to an object program in accordance with a preferred embodiment of the present invention. Source program 120 can be thought of as containing a series of "blocks" (for example, blocks A, B, C, and D). Source program 120 is input to compiler 124. Internally, compiler 124 determines the locations of blocks in the source program, generating in memory 104: a control flow graph (cfg), a data flow graph (dfg) and a plurality of data flow graphs—directed acyclic graphs (dfg-dag's). Compiler 124 also determines minimum cut sets of a cfg corresponding to each dfg-dag, as discussed below. A general discussion of a min-cut technique for a single flow network can be found in Cormen et al., Introduction to Algorithms, McGraw Hill & MIT Press, 1986 (hereinafter "CLR"), which is herein incorporated by reference. Compiler 124 then generates object program 122 in accordance with the minimum cuts. Details of FIG. 2 are described below in connection with FIGS. 3–12.

II. Details of a Preferred Embodiment

Figure 3:
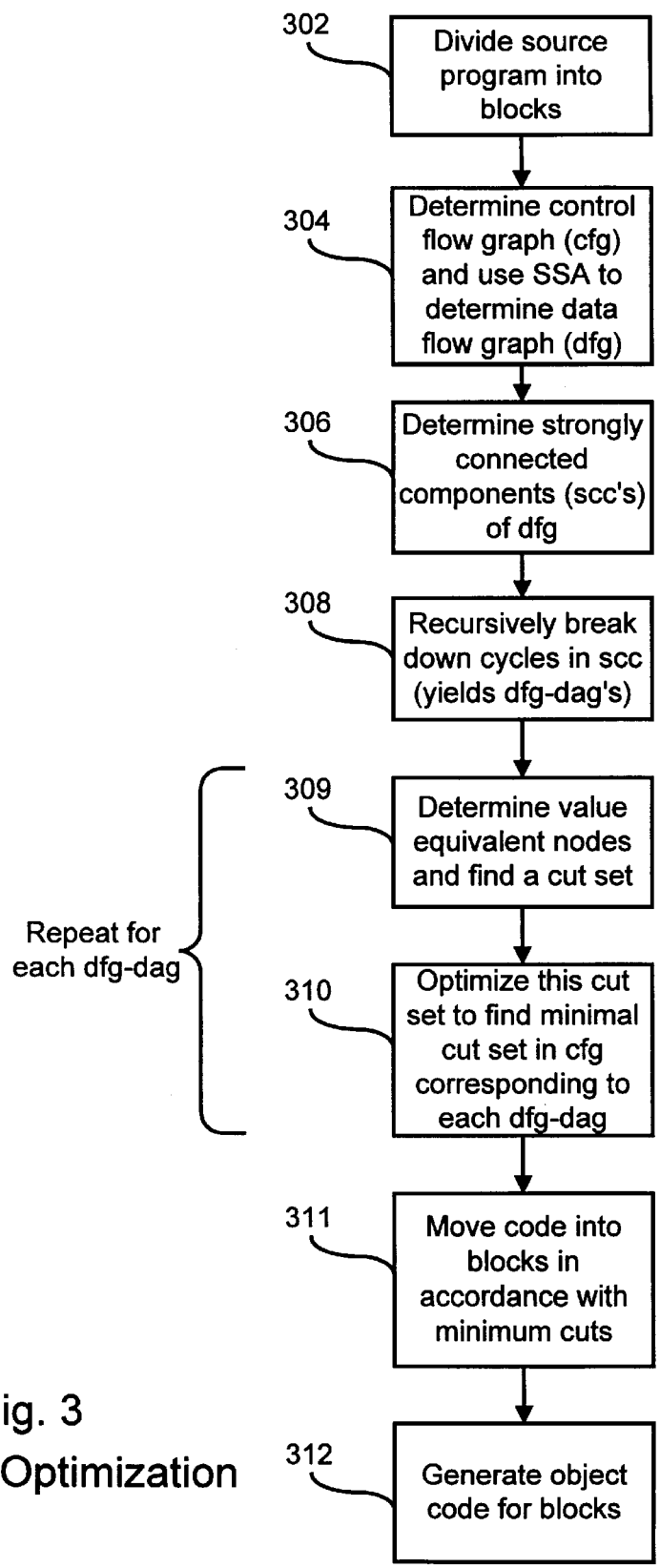
FIG. 3 is a flow chart showing steps of the method of FIG. 2.

FIG. 3 is a flow chart showing steps of the method of FIG. 2. In step 302, compiler 124 divides source program 120 into blocks.

Figure 4:
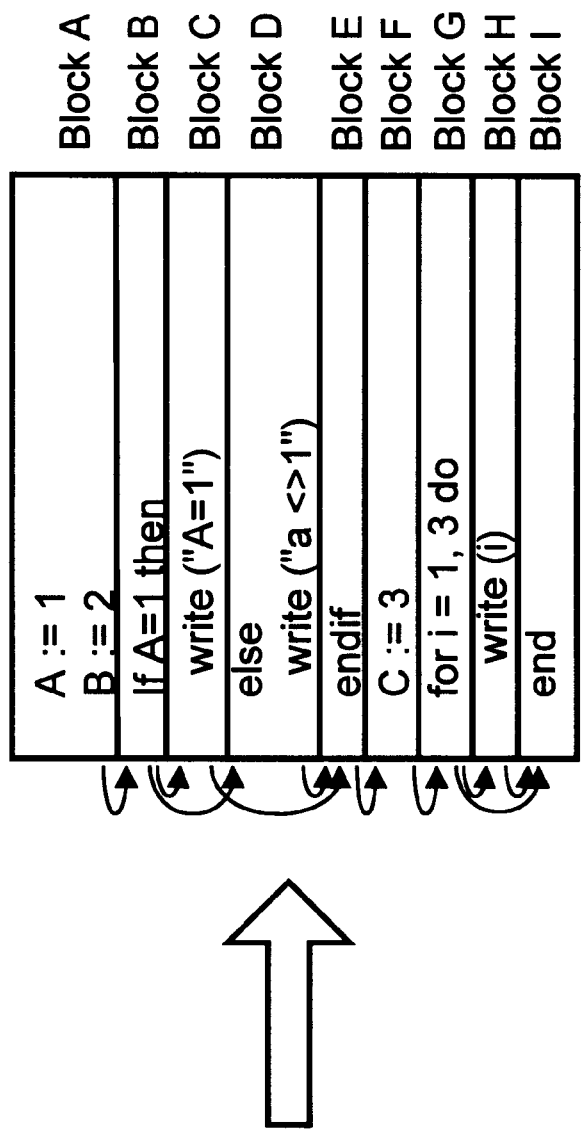
FIG. 4 shows an example of a source program divided into blocks.

FIG. 4 shows an example of a source program divided into blocks. The source program in the example is not intended to represent any particular programming language, but is intended to represent various constructs common to may programming languages, such as if-then-else statements (blocks B through E) and loops (blocks G through I). In FIG. 4, compiler 124 determines the location of blocks in source program 120 in accordance with conditional branches in the source program. The control flow at the end of a block may either proceed to the branch target or fall through to the following adjacent block. Thus, the "if-then" test is a block, the statement(s) under the "if-then" test are a block, the statement(s) under the "else" are a block, and the "endif" statement is a block. Similarly, the beginning, middle and end of the loop are designated as respective blocks. Methods of dividing a source program into blocks are well-known in the art and is described, for example, A. Aho, R. Sethi & J. Ullman, Compilers, Principles, Techniques, and Tools, published by Addison-Wesley, 1986, which is incorporated herein by reference. Any appropriate method of breaking a source program into blocks can be used.

In step 304 of FIG. 3, compiler 124 determines a control flow graph (cfg) and a data flow graph (dfg) for the blocks.

Figure 5A:
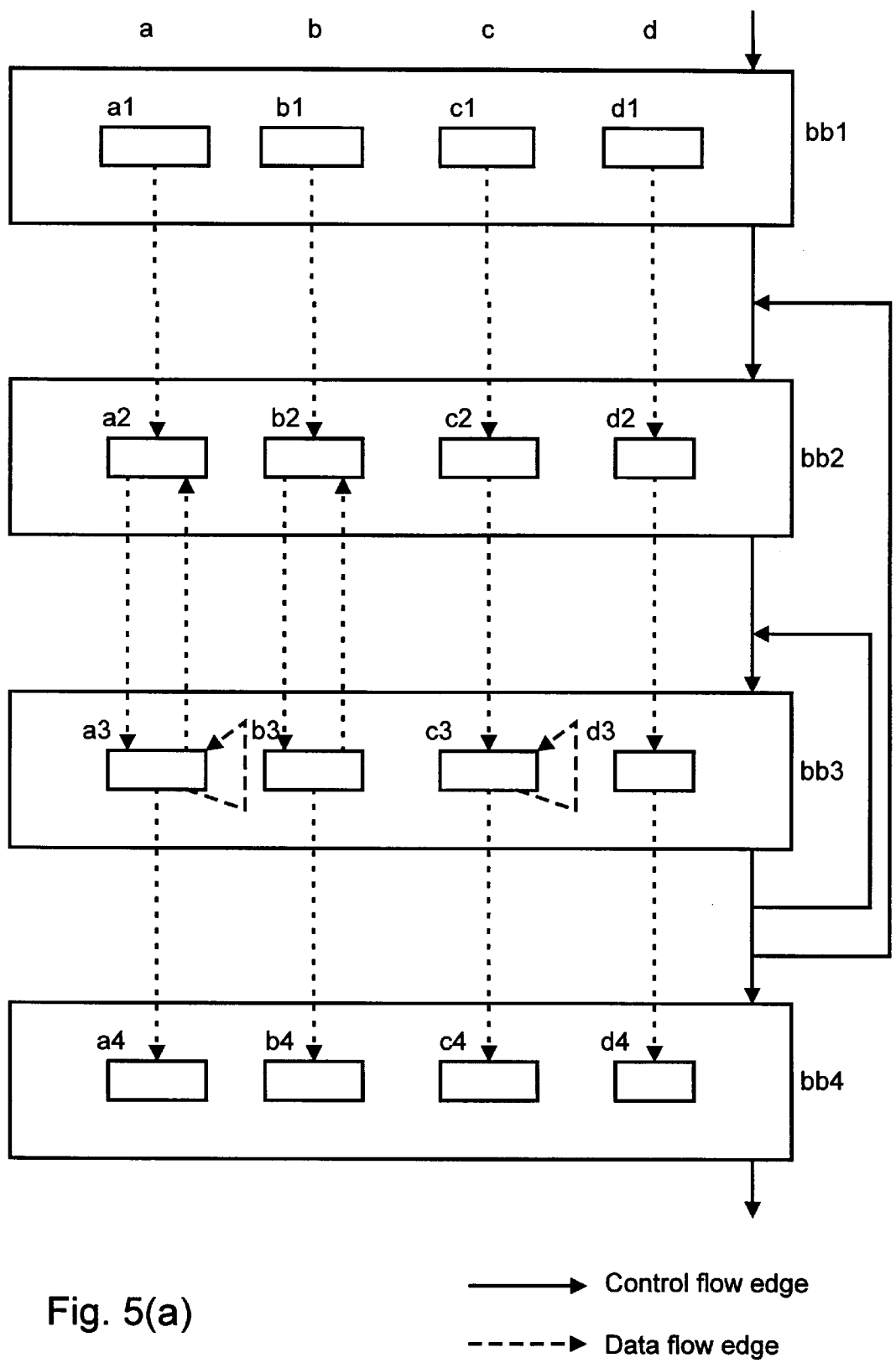
FIGS. 5(a) and 5(b) show a representation of a data flow graph.

FIG. 5(a) shows a representation of a control flow graph and a data flow graph for blocks bb1, bb2, bb3, and bb4 of a source program. The dotted lines represent data flow dependencies between statements within each block. For example, statement a2 relies on data produced by statement a1. Statement a3 relies on data produced by itself (a loop). Statement a3 relies on data produced by statement a2, and statement a2 relies on data produced by statement a3 (another loop). The dfg is created using a Static Single Analysis (SSA) technique.

FIG. 5(a) also shows control flow. The solid lines represent control flow between each block. Thus, block bb1 is followed by block bb2, which is followed by block bb3, which is followed by block bb4. There is an outer loop surrounding blocks bb2 and bb3 and an inner loop surrounding block bb3. Techniques for creating dfgs and cfgs are well-known in the art and will not be described in detail herein. See, generally Aho et al., Compilers, Principles, Techniques, and Tools.

In step 306, compiler 124 determines strongly connected components (scc's) of the dfg. This involves decomposing the dfg into nested subgraphs, each having entry and exit edges. In the following discussion, an "entry node" for a subgraph is a node in the subgraph that has an edge coming into that node from outside the subgraph. An "entry edge" is the edge entering an entry node. An "exit node" for a subgraph is a node that has an edge going from that node to a node outside the subgraph. An "exit edge" is an edge exiting an exit node. This decomposition creates abstract nodes representing subgraphs—where the abstract node has entry and exit edges. Nodes representing trivial sccs are not abstracted out, since the aim of the method is to create maximal dag's.

Figure 5B:
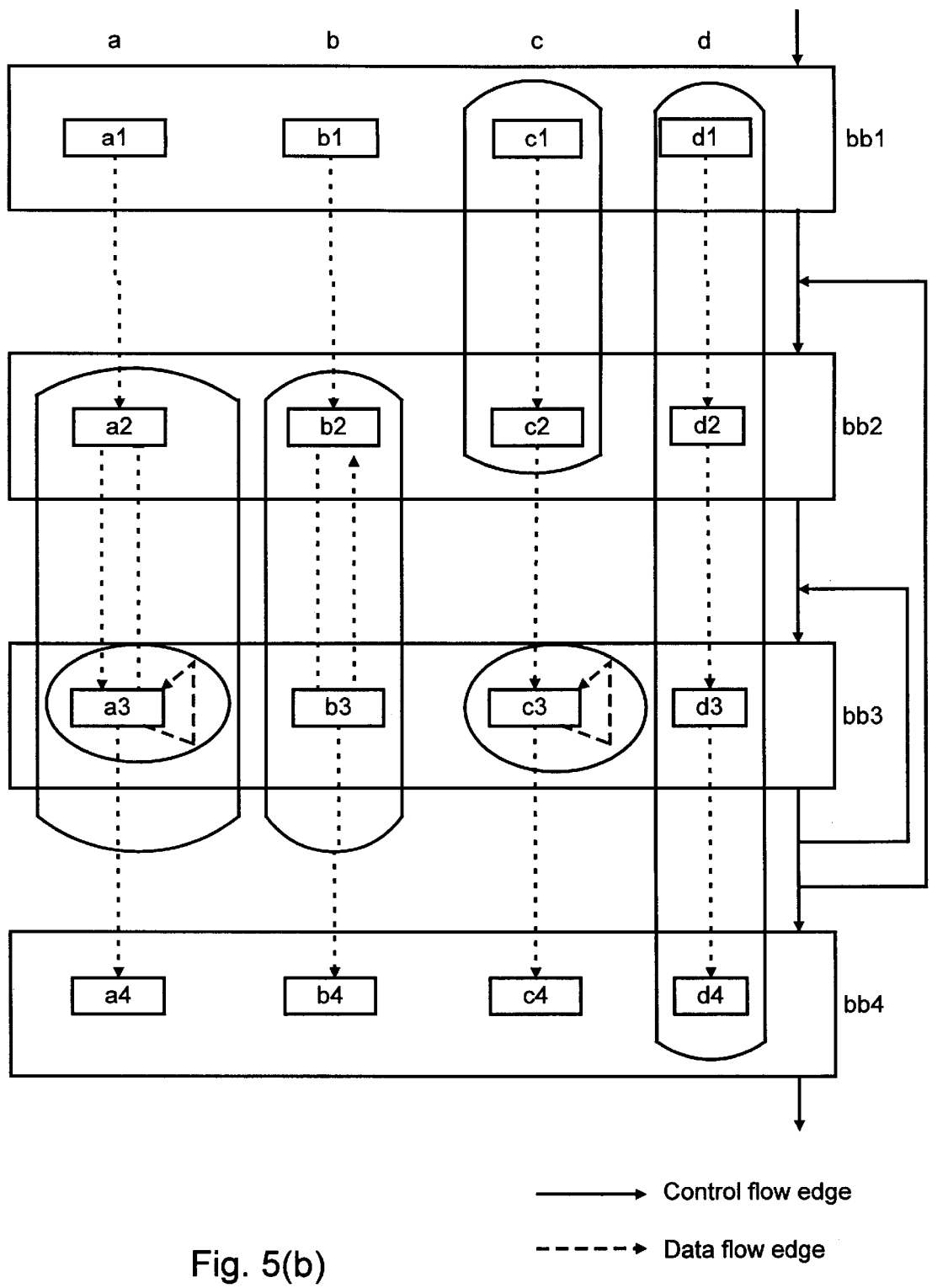

FIG. 5(b) shows an example of decomposing the dfg into scc's. In a preferred embodiment, this step is performed recursively. In general, the process is as follows:

1) start by identifying the top-level non-trivial sccs
2) Find the entry nodes of each (non-trivial) scc and remove those edges in the scc that go into entry nodes. Remove just enough edges to break all cycles involving the entry nodes. This removal can be effected using, for example, Targen's algorithm. Repeat recursively on what remains—creating abstract nodes and finding nested (non-trivial) sccs. (This is similar to finding nested loops, but is happening on the dfg, not a cfg). As specified above, the target of a removed edge is an entry. For reasons of symmetry, the source of a removed edge is identified as an exit, even though it may not meet the above definition of "exit."

The above steps leaves the dfg decomposed hierarchically into abstract nodes, each of which is a directed acyclic graph (dag). Each dag, D, is maximal with respect to being acyclic and has a set of entry nodes, ent(D) and exit nodes, ext(D). These dags are called dfg-dags.

Each non-trivial scc is circled in FIG. 5(b). In FIG. 5(b), the dfg is decomposed as follows: al is a trivial scc and, thus, a single node trivial dfg-dag. The subgraph including a2 and a3 is an scc with a2 the entry and a3 the exit. Remove the edge from a3 to a2, leaving a2 as the next dfg-dag, with a3 and its own edge as an scc. Then remove this back edge, leaving a3 as the next (trivial) dfg-dag. Node a4 is then the final (trivial) dfg-dag. The other scc's are determined similarly, leaving the dfg-dags shown in FIG. 6.

Figure 6:
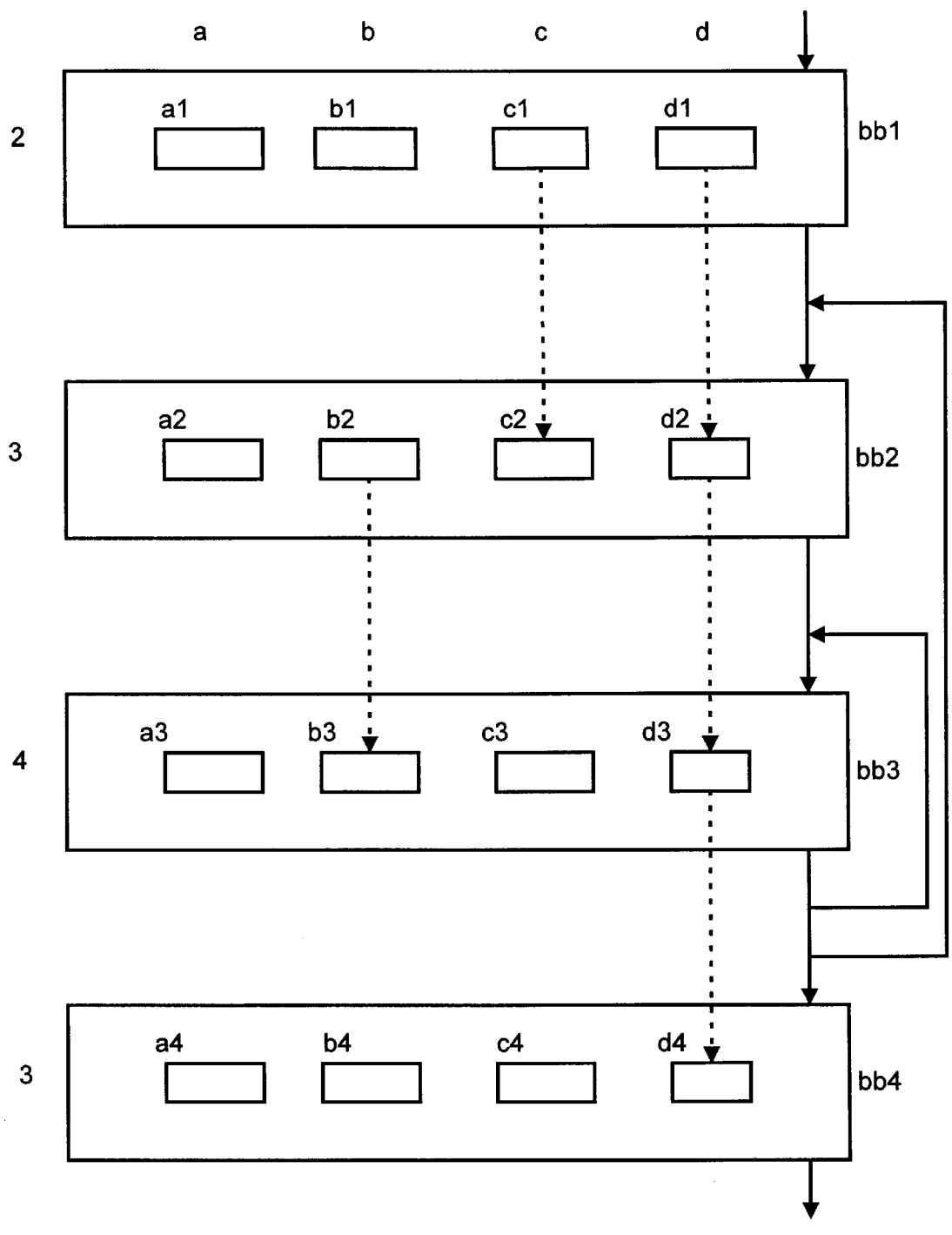
FIG. 6 shows a representation of dfg-dag's (data flow graphs—directed acyclic graphs) generated from the dfg of FIG. 5.

FIG. 6 shows a representation of a dfg-dag generated from the dfg of FIG. 5.

Each dfg node has a natural mapping, called the cfg mapping, into its containing control flow node. This is indicated by the following notation:

| dfg-side | cfg-side |
|---|---|
| ent(Node) → | ENT(Node) |
| ext(Node) → | EXT(Node) |

In step 309 of FIG. 3, compiler 124 determines value equivalent nodes for each dfg-dag and finds a "cut set," as described below. Specifically, compiler 124 uses a "removal of sources" algorithm to examine each node, n, of a dag D in turn. Each node, n, represents either an expression or an abstract node. The compiler processes the abstract nodes recursively. For an expression node, assuming value numbering has been performed earlier (as described below), compiler 124 finds other nodes in the dag D that are value equivalent to n. This set of value equivalent nodes is referred to as N.

Note that all nodes in N must be in a source position. In most cases, this follows automatically from the definition of value-equivalence. Predecessor nodes of value equivalent nodes in the same expression position will be value equivalent themselves and so, already processed. This process works recursively on predecessors until it determines a phi-function that merges different values. In general, any blocking nodes are processed first until all the members of N are exposed in a source position (i.e., with all their predecessors processed).

Boundary cases require special handling. When there is no edge into an scc from outside the scc, we need to identify an entry node. This entry node corresponds to an initial node, n, (an scc with no cycles). The compiler makes the cfg entry for such an entry node, ENT(n) to be the program cfg entry. There is a possible complication in defining the cfg mapping (for computing the cut set, as described below) when the compiler coalesces names for value numbering. This coalescing sometimes allows two dfg nodes to map to the same basic block. If the compiler determines that this can occur, then it splits the block in two. This technique is discussed below in a separate section of this document.

In step 309, after a value equivalent set N is found, the compiler 124 determines a cut set for the cfg corresponding to the current dfg-dag. An important technical aspect of the described embodiment is generalizing the concept of "dominator" A dominator is a single cfg node through which execution must pass before it reaches a node of interest. A "cut" is a set of nodes such that control must pass through one of them before it reaches a node of interest. These concepts are useful for optimization because when the compiler moves a computation or operation, it must ensure that any successor operation always has its inputs already computed. Placing the input computation in a dominator or, more generally, in each node of a cut, insures this. Some aspects of dominators are discussed in Gupta, "Generalized Dominators and Post-Dominators," 19th Annual POPL, Jan. 1992, pp. 246–257, which in herein incorporated by reference. The purpose of determining a minimum cut set is for the compiler to be able to move computations into cut sets where the cut sets are chosen to have minimum execution counts.

Once compiler 124 determines the set of equivalent nodes N, compiler 124 forms C(N), the subgraph including all cfg paths from ENT(D) to EXT(D) going through a node of N. Note that C(N) is not necessarily acyclic. The set N is a "cut" for C(N). Although conventionally, a cut set is defined as N and all nodes preceding it, this document uses the term to refer only to the "boundary" nodes in a conventional cut set.

In step 310 of FIG. 3, compiler 124 optimizes the cut sets to find a minimum cut set for the each C(N). This is done using the incremental flow analysis method of FIG. 7. In general, this step finds the minimum cut set for C(N) based on the cut N—a set of cfg nodes including the entry nodes. This cut is used to determine the code placement for n.

Figure 7:
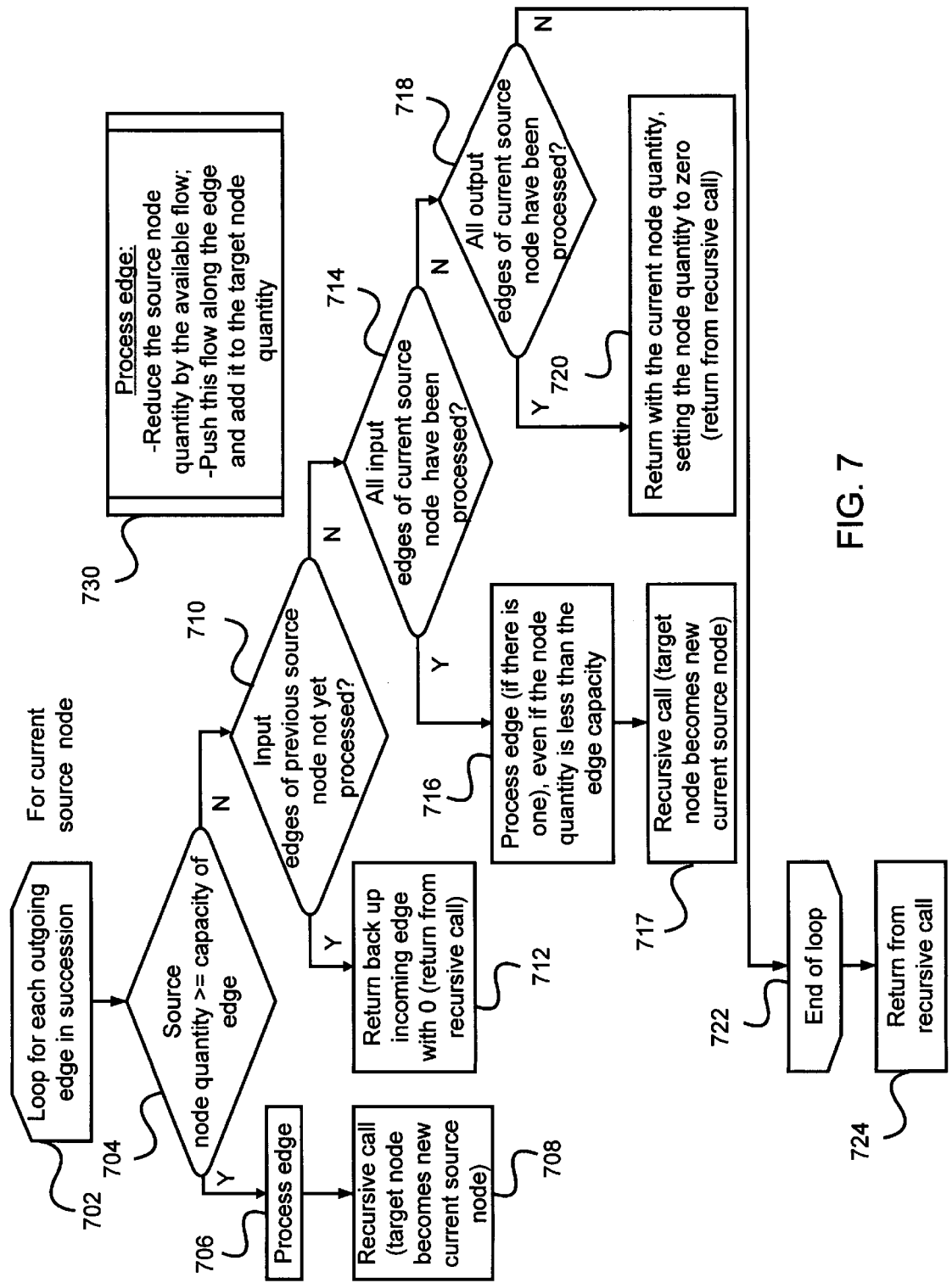
FIG. 7 is a flow chart showing details of an incremental flow analysis step of FIG. 3.

FIG. 7 is a flow chart showing details of an incremental flow analysis step of FIG. 3. This analysis is applied to each, recursing upwards to the outer cfgs. FIGS. 8(a) through 8(m) show an example of in accordance with a preferred embodiment of the present invention.

FIG. 7 incorporates the following general rules:

processing an edge carries as much available flow as it can from the node (determined by the minimum of the remaining flow and the edge capacity). The new current node quantity is reduced by the amount carried down this edge.

when entering a node, add the edge flow to the current node quantity (also called node input flow), if a node runs out of flow to push down an out edge, then return (additional flow can come in via other input edges, unless the last input edge has been processed), each processed edge returns an excess flow which is added back into the current node quantity, and when done with all edges, return with the current node input value as excess flow.

The process of FIG. 7 starts with edge capacities and manipulates flow amounts along edges and node quantities at each node In FIG. 8, flow through an edge is shown in a square. A node quality is shown in a circle. All flow amounts and node quantities start at "0". Entry nodes can provide any amount of flow and exit nodes can consume any amount.

The steps of FIG. 7 represent a recursive procedure that is initially called for each entry node of a C(N) (where the entry node of C(N) is the initial current source node). Steps 702 and 724 represent a loop performed so that each edge of the current source node is considered in turn. Each edge has a source node and a target node.

Step 730 contains the steps included in "processing an edge." Processing an edge reduces the source node quantity by the available flow, pushes this flow along the edge, and adds it to the target nodes quantity. (If the source node is an entry node, the available flow is just the edge capacity).

Figure 8C:
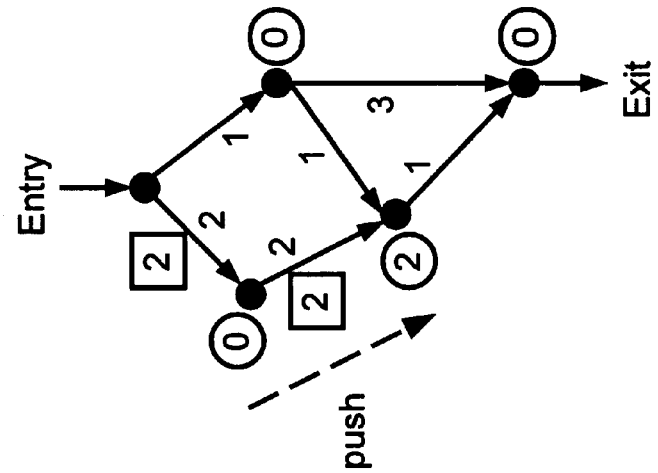
FIGS. 8(a) through 8(m) show an example of a preferred embodiment of the present invention.
Figure 8B:
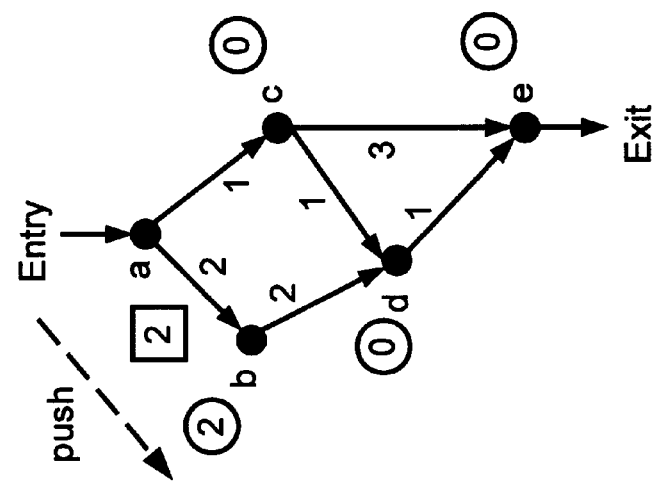
Figure 8A:
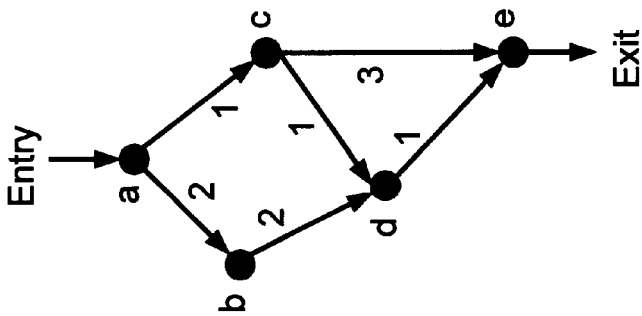
Figure 8F:
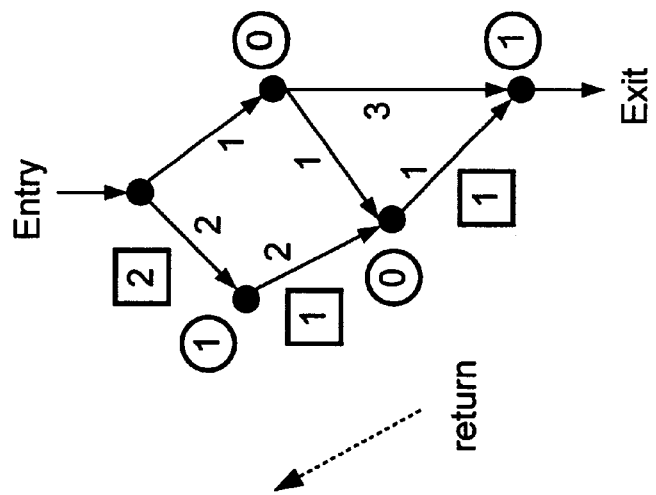
Figure 8E:
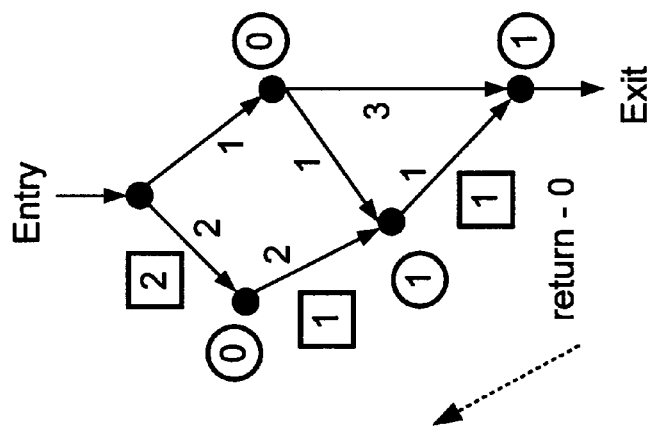
Figure 8D:
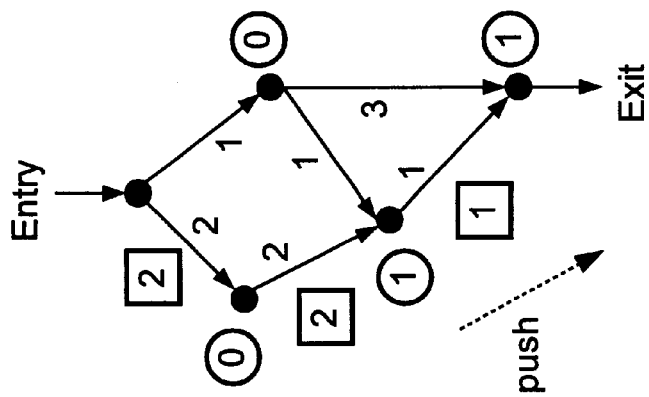

For each source node, compiler 124 processes the edges leaving the source node, in succession, as follows:

If the source nodes quantity is greater than or equal to the capacity of the next edge (step 704), process that edge (see step 730) and recursively call the flow procedure. Otherwise (step 710), if there are input edges of a previous source node not yet processed, return back up the incoming edge with 0 (i.e., return from a recursive call). An example of this is shown in FIGS. 8(e) and 8(f). Otherwise (step 714), if all input edges of the current source node have been processed, then process the next edge (see step 730) if there is one (even if the node quantity is less than the edge capacity). An example of this is shown in FIGS. 8(a) and 8(b). Otherwise, go to step 718.

Figure 8I:
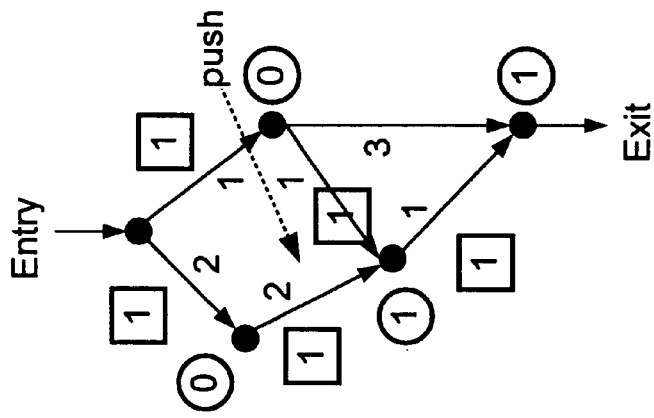
Figure 8H:
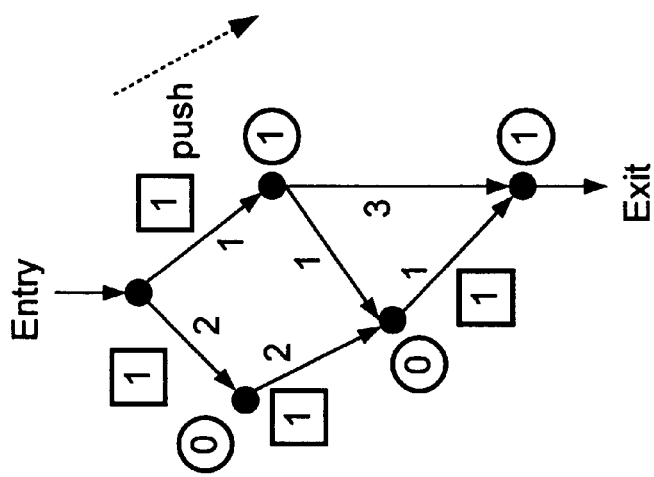
Figure 8G:
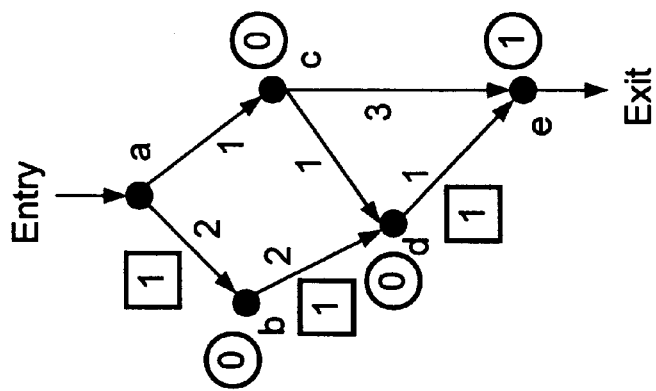
Figure 8L:
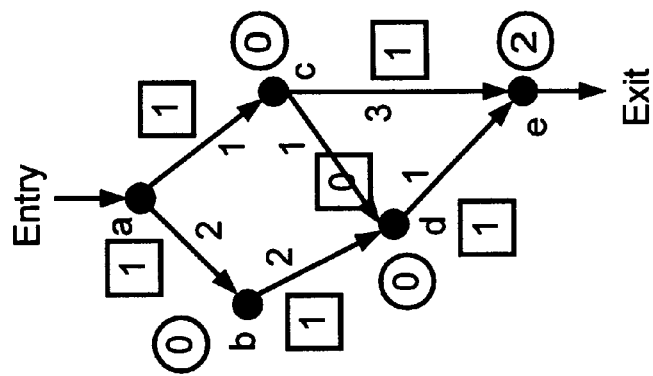
Figure 8K:
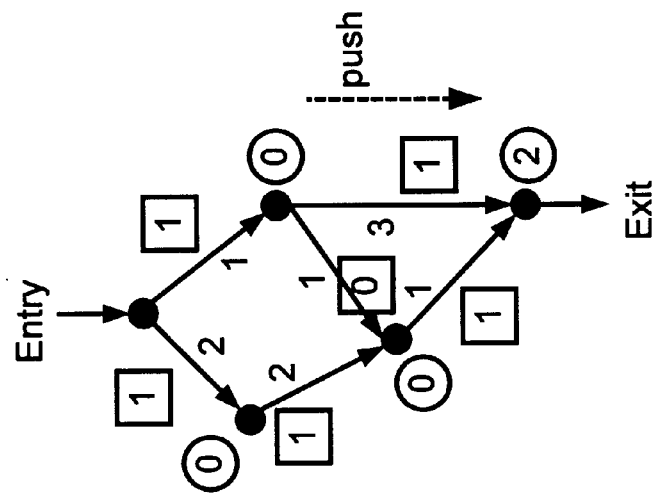
Figure 8J:
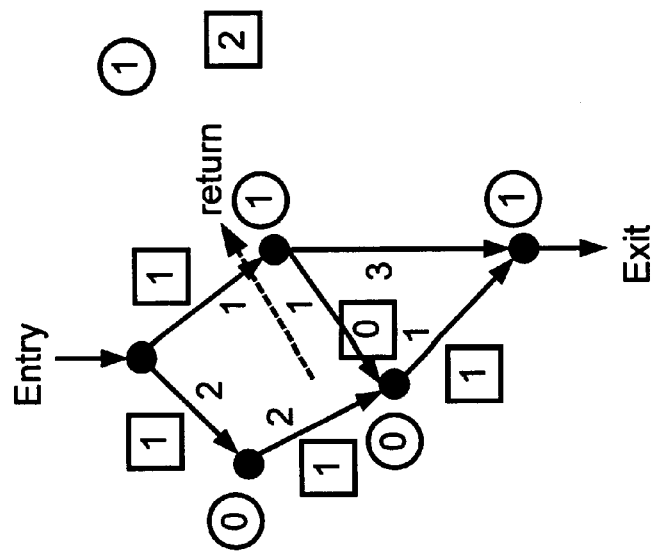

In step 718, when all output edges of the current source node have been processed, return with the current node quantity, setting the current source node quantity to zero. An example of this is shown in FIGS. 8(i) and 8(j).

Figure 8M:
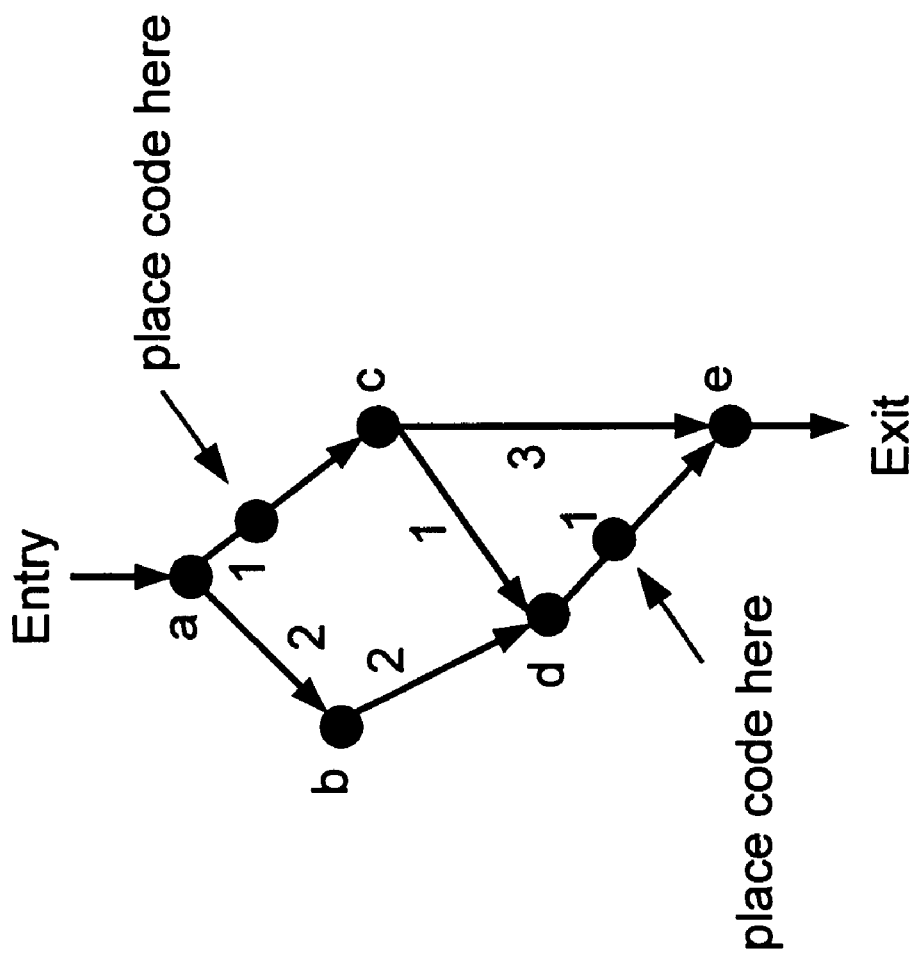

At the end of the method of FIG. 7, each edge of C(N) has a flow value. A "saturated edge" is an edge where the flow value is equal to the edge capacity. In FIG. 8(m), there are two saturated edges: (a,c) and (d,e). If the flow value of an edge is less than the edge capacity, the edge is called a "residual edge." A residual path is one consisting only of residual edges (i.e., a path that does not cross a saturated path). The minimal cut consists of any node reachable from the entry by a residual path. Thus, in FIG. 8(m), the cut set is {a, b, d}. The boundary edges (which go from a node in the cut set to one outside are (a,c) and (d,e)). Normally, code is placed at one of the nodes of a boundary edge. However, this is feasible only if one of those nodes has the same execution count as the edge itself. The situation where this is not the cases arises because the graph we are considering is only a part of a larger one. To deal with this situation, it is necessary to split these edges with an additional node, so the execution count is preserved. This is because, although edge (a,c) is traversed just once, node a is traversed 3 times and node c is traversed 4 times. The situation for edge (d,e) is similar.

In general, for a flow network G with a computed flow, we define the upstream part U(G) to be nodes such that there is a residual path from an entry to the node. The downstream part D(G) consists of nodes such that there is a residual path from the node to an exit. If a flow network with residual flows is modified in some way, the revised flow can be computed by using basically the above method organized around worklists of nodes to be processed.

The following paragraphs provide a theoretical discussion of verification of cut order correctness.

We start with the residual flow on a flow network G=C (N,D), as above, and a cut N. Recall that the formal cut for N, FC(G,N), consists of all nodes on paths from entry nodes to nodes in N. We define MC(G,N)=FC(G,N)+U(G)−D(G).

We claim this is a minimal cut:

To verify this claim, we must determine that the flow for G, f(G) (for G=FC(G,N), equals c(MC(G,N)), the sum of the capacities for the leaving edges. (See lemma 27.5 and theorem 27.7 in CLR).

MC(G,N) has the same flow as FC(G,N) but since its boundary edges are at capacity, this is also the same as c(MC(G,N)).

Consider two dependent expressions e and f, where e must be computed before f. We must verify that the corresponding minimal cuts $M_e$ and $M_f$ also satisfy this ordering. Let $N_e$ and $N_f$ be the original cuts for e and f where there is an edge in D from e to f. Now $M_e$ is computed in the subgraph $C(N_e)$ and $M_f$ in $C(N_f)$. Since we are processing the expressions of D in dag order we compute a flow for $C(N_e)$ along with a minimal cut and the compute a flow for $C(N_f)$. For efficiency we actually keep the edge flow values for $C(N_e)$ and incrementally update them to get the flow for $C(N_f)$.

We must modify the flows along paths that go through $N_e$ but not $N_f$. We find the flow of such a path as it exits $C(N_e)$ and push that amount of flow back toward the entries decreasing the flow on each edge successively. This flow can go forward in $C(N_f)$. Note, however, that flow introduced before the minimal cut, $M_e$, cannot be pushed forward because of the boundary saturation.

Assume that we have a residual path $C(N_e)$ to a node x, i.e., it is upstream. This node will be added in to our original cut $N_e$. If x is not already in $N_f$, then we must verify that it is added in to $N_f$ also. Because of the residual path, x is before $M_e$. Thus, any flows introduced on the residual path cannot be pushed forward. Thus, we only decrease flows on this path in making the transition from $C(N_e)$ to $C(N_f)$. Thus, the same residual path is still valid in $C(N_f)$, although it may have different flow values. This means that x is added to $N_f$ also. The other case for down stream nodes is symmetric.

Returning to FIG. 3, in step 311, compiler 124 moves code into different blocks in accordance with the minimum cuts as follows: The upstream nodes of N (along with any connected cdg edges and nodes) are propagated forward along saturated edges from the nodes ENT(D) to the cut set nodes, making copies of cfg edges and nodes where necessary, e.g., where there is a cfg split. Propagation stops at cut set nodes. Next, the downstream nodes of N not already at the cut set (along with any connected cdg edges) are propagated backwards along saturated edges from the nodes EXT(D) similarly also stopping at cut set nodes.

Figure 9:
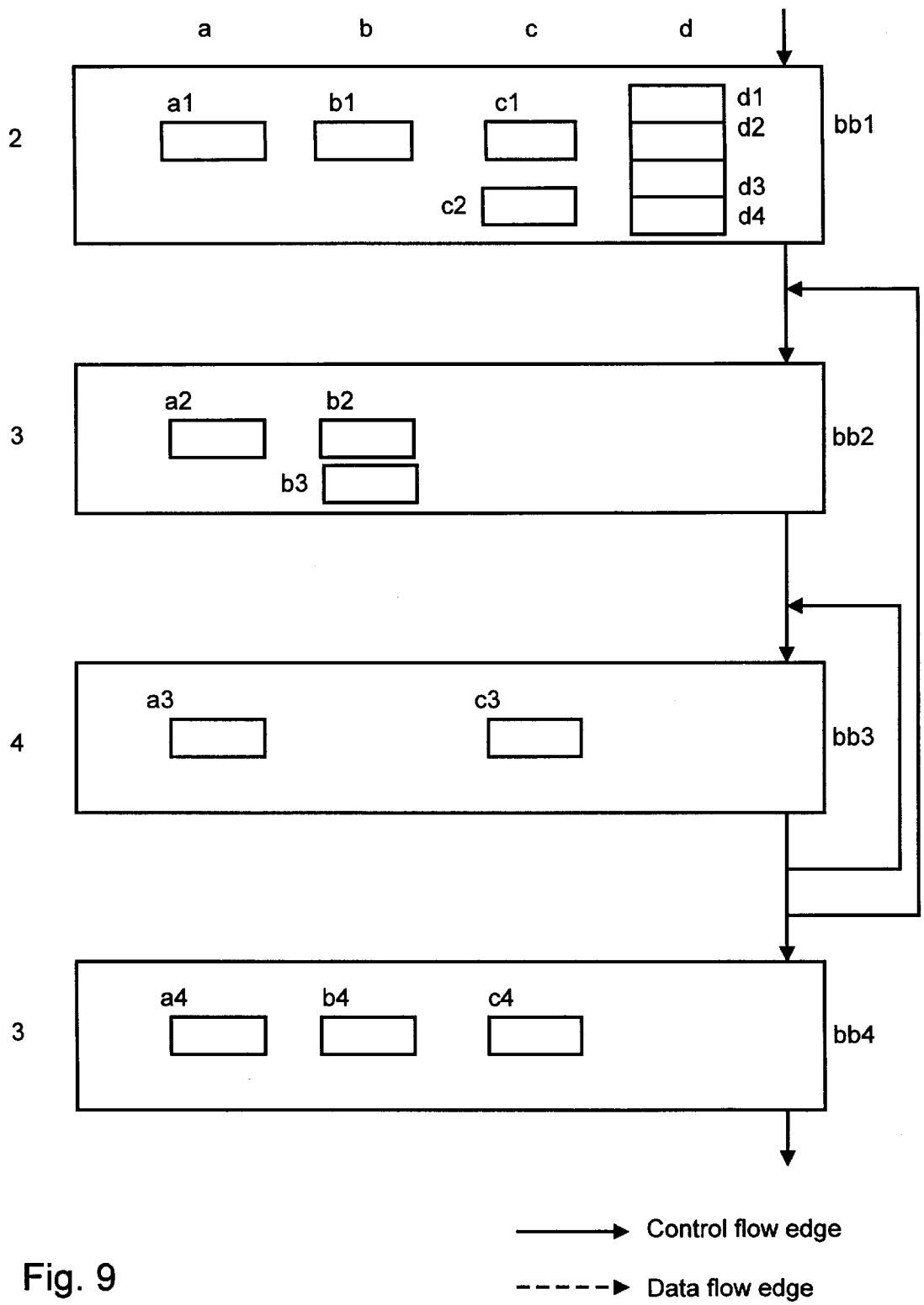
FIG. 9 shows an example of code moved into blocks in accordance with minimum cuts.

FIG. 9 shows an example of code moved into blocks in accordance with a minimum cut set. In the example, code b3 is moved from block bb3 to block bb2. Code c2 is moved from block bb2 to block. Code d2, d3, and d4 are moved from, respectively, block bb2, block bb3, and block bb4 to block bb1.

The following paragraphs discuss a coalescing technique used in a preferred embodiment of the present invention. The following discussion relates to determination of value equivalent nodes.

When a compiler uses a phi-function (as is known in the art), it creates artificially different names for the same expression in different places. This causes value numbering to generate different values—unnecessarily limiting code motion. Thus, when value numbering is used for code motion, it must be augmented. The goal is to make as many names as possible the same if they appear in the same phi-function or if they appear in a copy operation.

This name modification is accomplished by using a form of coalescing, as described generally in Preston Briggs, "Register Allocation Via Graph Coloring," Thesis, Rice University 1992, which is herein incorporated by reference. After applying coalescing to a dfg-dag, separate value numbering is performed on the dfg-dag that gives coalesced names the same value. The initial values used by this separate numbering are values from the standard global value numbering. This separate numbering can be very simple, since we are applying it to a dag.

The step in this numbering process are:

determine lifetimes, determine partial conflict information—at each assignment (definition) except for a copy of a phi-function, insert conflict between the target variable and the variables that live at that point.

process each copy of phi-function operation in order with highest execution cost first, a) for each of these operations, merge their names if they do not conflict, and b) merging names requires combining names in the conflict graph and also lifetime information. This combining typically will create conflicts in names in operations that have not been visited yet. (This is preferably done with equivalence classes and representatives implemented with MF sets).

Figure 10:
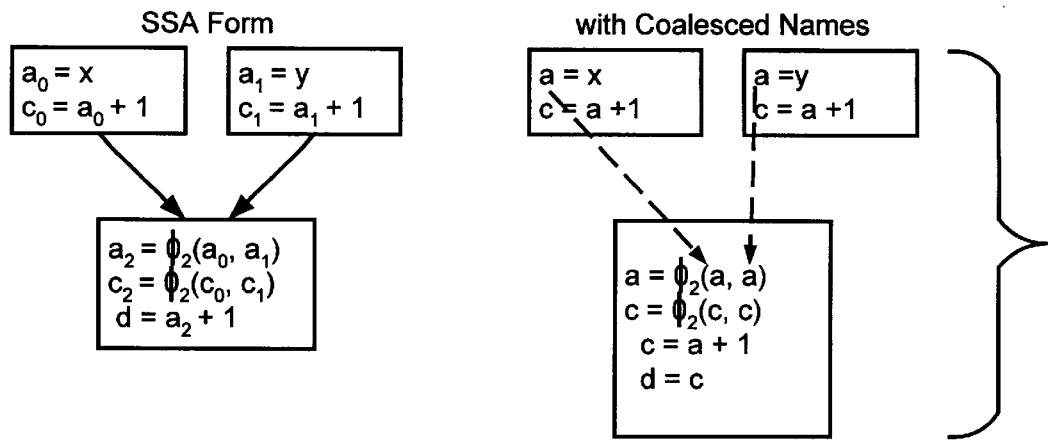
FIG. 10 shows an example of how a compiler in accordance with a preferred embodiment of the present invention uses coalesced names.

FIG. 10 shows an example of the effects of name value coalescing.

```
If C then do a=x; c=a+1;end
   else do a=y; c=a+1 end
   d=a+1
```

This process then removes artificial restrictions on the placement of the expression "a+1" allowing a set of expressions in different control flow positions to all have the same value.

The following paragraphs talk about the placement of these expressions with respect to control flow. This is done using the original target variable name (in SSA form) for the expression definition. In the above example, for expression "a+1", these names are $c_0$, $c_1$, and $c_2$—corresponding to the placements in the three different basic blocks.

Another additional complication is that these expression placement names occur in the same basic block. For the purposes of placement computation, there is a need to distinguish these placement positions based on cuts of basic blocks. To make this work, the compiler splits such basic blocks while building the flow network for the placement method to work on. The clock is split just before the positions of the placement names. A split, of course, requires adding a single control flow edge to connect the sections.

Figure 11:
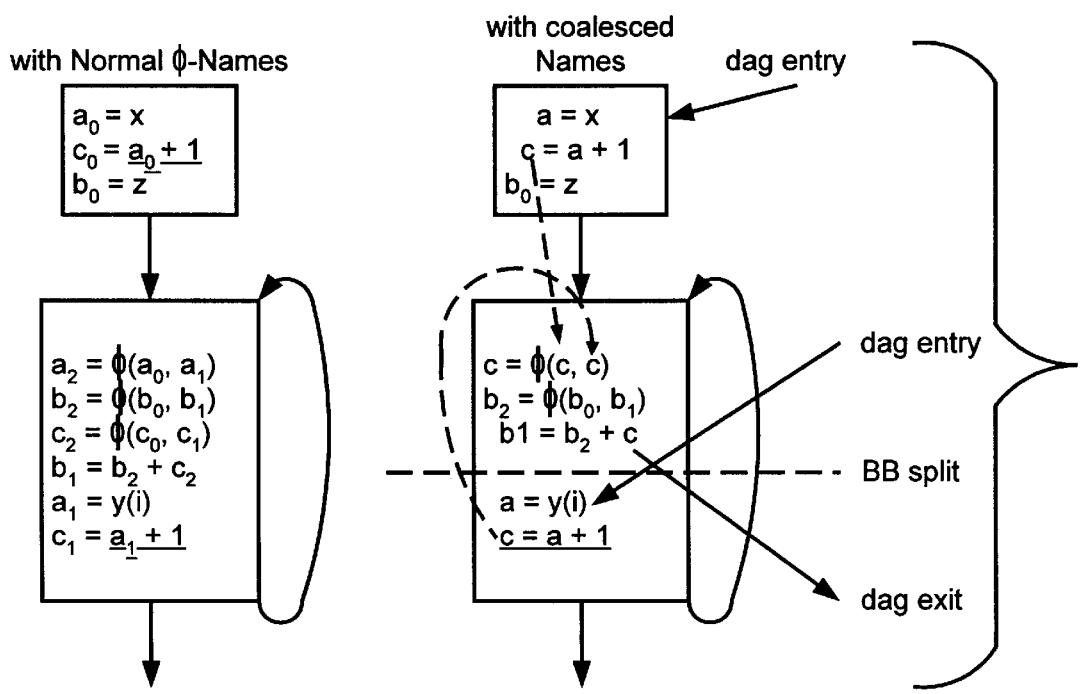
FIG. 11 shows another example of coalesced names.
Figure 12:
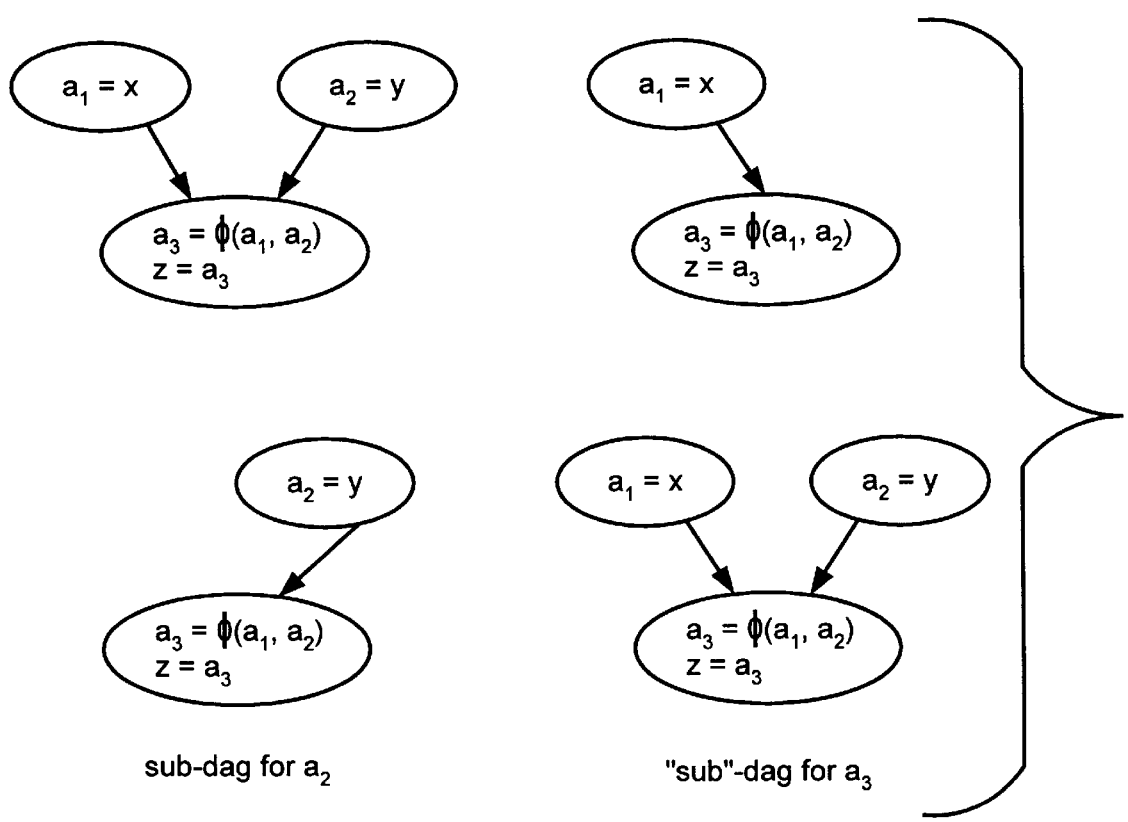
FIG. 12 shows yet another example of coalesced names.

FIG. 11 shows an example of how this occurs for:

```
a=x
c=a+1
b=z
For I=1,n
   begin
   b=b+c
   a=y(l)
   c=a+1
   end
```

Note that both $c_1$ and $c_2$ occur in one basic block—so that block is split. This split allows the flow placement method to distinguish between these tow possible placements.

The following diagram shows how the subgraphs C(N) are selected from the whole dfg-dag when placing individual expressions. There are different sub-dags for each expression $a_1$, $a_2$, $a_3$. These subgraphs control where an expression can move.

In summary, a described preferred embodiment of the present invention applies an adaptive optimization technique to determine how to reorder computer instructions during compilation.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method of compiling a source program into an object program and of optimally placing code blocks of the source program, the steps performed by a data processing system, of:

receiving the source program;

dividing the source program into source program blocks;

determining a control flow graph, a data flow graph, and a plurality of dfg-dag's for the source program;

finding a minimum cut set in a control flow graph generated in accordance with the dfg-dag's; and moving computer instructions between the source code blocks in accordance with the minimum cut set.

2. A computer program product including:

a computer usable medium having computer readable code embodied therein for causing compilation of a source program into an object program and of optimally placing code blocks of the source program, the computer program product comprising:

computer readable program code devices configured to cause a computer to effect receiving the source program;

computer readable program code devices configured to cause a computer to effect dividing the source program into source program blocks;

computer readable program code devices configured to cause a computer to effect determining a control flow graph, a data flow graph, and a plurality of dfg-dag's for the source program;

computer readable program code devices configured to cause a computer to effect finding a minimum cut set in a control flow graph generated in accordance with the dfg-dag's; and computer readable program code devices configured to cause a computer to effect moving computer instructions between the source code blocks in accordance with the minimum cut set.

3. A computer data signal embodied in a carrier wave and representing sequences of instructions which, when executed by a processor, cause said processor to compile a source program into an object program, optimally placing code blocks of the source program, by performing the steps of:

executing a computer program to receive the source program;

executing the computer program to divide the source program into source program blocks;

executing the computer program to determine a control flow graph, a data flow graph, and a plurality of dfg-dag's for the source program;

executing the computer program to find a minimum cut set in a control flow graph generated in accordance with the dfg-dag's; and executing the computer program to move computer instructions between the source code blocks in accordance with the minimum cut set.

4. An apparatus that compiles a source program into an object program and that optimally places code blocks of the source program, comprising:

a portion configured to receive the source program;

a portion configured to divide the source program into source program blocks;

a portion configured to determine a control flow graph, a data flow graph, and a plurality of dfg-dag's for the source program;

a portion configured to find a minimum cut set in a control flow graph generated in accordance with the dfg-dag's; and a portion configured to move computer instructions between the source code blocks in accordance with the minimum cut set.

* * * * *